United States Patent [19]

Goto et al.

[11] 3,911,674

[45] Oct. 14, 1975

[54] CONTROL APPARATUS FOR ENGINE EXHAUST GAS PURIFICATION SYSTEM

[75] Inventors: Kenji Goto; Norio Shibata; Ryozo Mitsui, all of Susono, Japan

[73] Assignee: Toyota Jidosha Kogyo Kabushiki Kaisha, Toyota, Japan

[22] Filed: Jan. 15, 1974

[21] Appl. No.: 433,478

[30] Foreign Application Priority Data

Jan. 22, 1973 Japan.................................. 48-8730

[52] U.S. Cl. ....................... 60/278; 60/288; 60/290; 123/119 A; 235/201 ME
[51] Int. Cl.² .......................................... F02B 75/10
[58] Field of Search ............. 60/274, 278, 285, 286, 60/287, 288, 289, 290, 277; 251/26, 28, 29; 123/140 MC, 119 A; 235/201 ME

[56] References Cited
UNITED STATES PATENTS

| | | | |
|---|---|---|---|
| 3,161,207 | 12/1964 | McCarvell | 251/29 |
| 3,263,413 | 8/1966 | Vactor | 60/277 |
| 3,300,174 | 1/1967 | Urban | 251/29 |
| 3,581,490 | 6/1971 | Morris | 60/288 |
| 3,680,318 | 8/1972 | Nakajima | 60/290 |
| 3,730,157 | 5/1973 | Gerhold | 60/285 |
| 3,791,144 | 2/1974 | Lang | 60/278 |
| 3,805,522 | 4/1974 | Sheppard | 60/290 |

*Primary Examiner*—Douglas Hart
*Attorney, Agent, or Firm*—Stevens, Davis, Miller & Mosher

[57] ABSTRACT

A control apparatus for use in an engine exhaust gas purification system which includes any combination of an EGR (exhaust gas recirculation) system, an exhaust gas oxidation reactor such as a catalyzer converter, a manifold reactor and/or an afterburner, and a secondary air injection system. The control apparatus comprises devices for detecting engine operating conditions in terms of the temperature of the engine cooling water, the ambient temperature, the internal temperature of the exhaust gas oxidation reactor and the vehicle speed for producing pneumatic signals of atmospheric pressure when the detected information reaches respective predetermined levels, and a selective actuating mechanism including a change-over valve, a one-way valve, an orifice and a passage for logically processing the pneumatic signals of the detecting devices for producing pneumatic signals of positive pressure or of intake manifold vacuum to selectively actuate an EGR control valve and the intake manifold, a change-over valve disposed midway of the exhaust pipe for changing introduction of the exhaust gases between the oxidation reactor and a bypass passage, and a changeover valve for supplying therethrough secondary air to the oxidation reactor.

8 Claims, 2 Drawing Figures

CONTROL APPARATUS FOR ENGINE EXHAUST GAS PURIFICATION SYSTEM

BACKGROUND OF THE INVENTION

1. Field of the Invention

The present invention relates to a control apparatus for use in an engine exhaust gas purification system of a vehicle such as an automotive vehicle. The engine exhaust gas purification system may include as customary any combination of an exhaust gas recirculation (EGR) systems, an exhaust gas oxidation reactor such as a catalyzer converter, a manifold reactor and/or an afterburner, and a secondary air injection system. More particularly, the present invention relates to a control apparatus of the above type which is responsive to engine operating conditions for selectively actuating a control valve of the engine exhaust gas purification system with the use of pneumatic signals.

2. Description of the Prior Art

The conventional control apparatus of this kind is constructed so as to be responsive to engine operating conditions such as the ambient temperature, the engine warm-up condition, the vehicle running condition and the over-heat condition of the exhaust gas oxidation reactor in terms of the temperature of the engine cooling water, the ambient temperature, the internal temperature of the oxidation reactor and the vehicle speed, so that the diaphragm-type control valves for the exhaust gas purification system may be selectively actuated. In this instance, the actual opening and closing operations of the control valves are carried out by the engine intake vacuum or by a discharge pressure of an air pump, and the temperatures of the above-identified portions as well as the vehicle speed are detected by electric sensors, whose electric signals are electrically processed and then supplied to the control valves. For this purpose, the control valves require electromagnetic mechanisms that can be brought into operation by electric signals, and the control apparatus requires the circuits of both pneumatic and electric types. This inevitably makes the overall construction of the control apparatus highly complicated and accordingly invites a remarkable high cost.

SUMMARY OF THE INVENTION

It is, therefore, an object of the present invention to provide a simplified control apparatus for use in an engine exhaust gas purification system which includes any combination of an exhaust gas recirculation system, an exhaust gas oxidation reactor such as a catalyzer converter, a manifold reactor and/or an afterburner, and a secondary air injection system.

Another object of the present invention is to provide a simplified control apparatus of the above type which detects engine operating conditions for producing pneumatic signals. These pneumatic signals are then logically processed to selectively actuate control valves of the engine exhaust gas purification system.

BRIEF DESCRIPTION OF THE DRAWINGS

Other objects and advantages of the present invention will be apparent from the following description taken in conjunction with the accompanying drawings, in which:

FIG. 1 is a diagrammatical representation showing one embodiment of a control apparatus according to the present invention; and FIG. 2 is a longitudinal section showing a selective actuating device for use in the control apparatus of the present invention.

DESCRIPTION OF THE PREFERRED EMBODIMENT

Figures 1, 2:
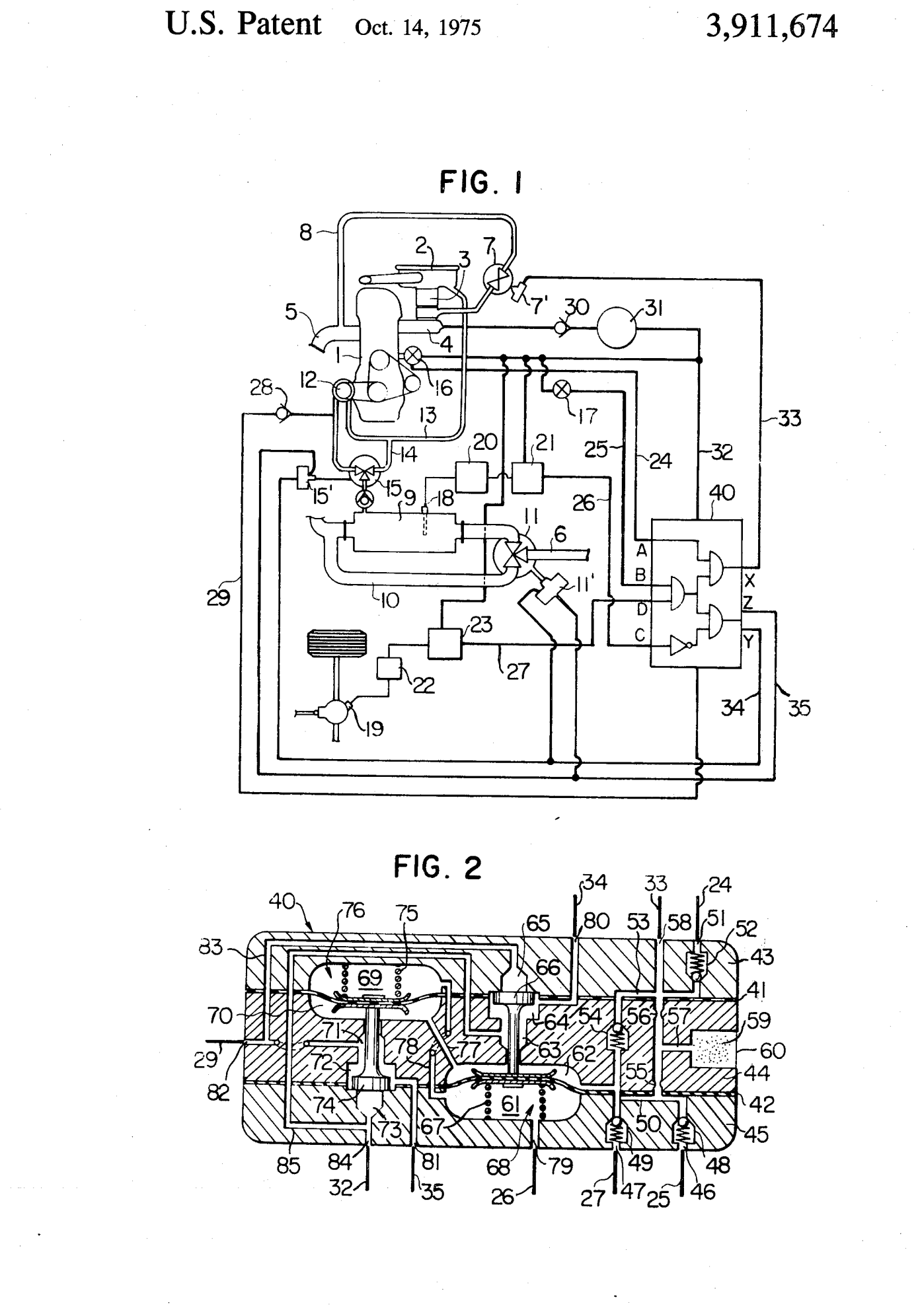

Reference will now be made to FIG. 1 showing the overall construction of the control apparatus of the present invention. In FIG. 1, an engine for an automotive vehicle includes, as is well-known in the art, an engine main body 1, an air cleaner 2, a carburetor 3, an intake manifold 4, an exhaust manifold 5 and an exhaust pipe 6. In the automotive engine, an exhaust gas recirculation passage 8 is disposed for providing communication between the exhaust manifold 5 and the intake manifold 4. The exhaust gas recirculation passage 8 is provided with a control valve 7, which is operative to pass therethrough a portion of the engine exhaust gases, when it is opened, so that the portion of the engine exhaust gases may be admixed with an air-fuel mixture in the engine combustion chamber. This will lead to reduction in the combustion temperature in the combustion chamber. As a result, the concentration of nitrogen oxides ($NO_x$) in the engine exhaust gases can be reduced. The control valve 7 is also operative to stop the reducing operation of $NO_x$, when it is closed. The exhaust gas purification system may further include a catalyzer converter 9 disposed midway of the exhaust pipe 6, a bypass passage 10 disposed in parallel with the catalyzer converter 9, and a change-over valve 11 for selectively connecting the two with the exhaust pipe 6. The exhaust gas purification system may further include a secondary air supply passage 13 provided with an air pump 12, which is driven by the engine, for providing communication between the air cleaner 2 and the catalyzer converter 9, a bypass passage 14 disposed in parallel with the air pump 12, and a change-over valve 15 for selectively connecting the two passages 13 and 14. When the two change-over valves 11 and 15 are brought into operation to connect the catalyzer converter 9 with the exhaust pipe 6 and to connect the former with the secondary air supply passage 13, then the unburned contents in the engine exhaust gases such as carbon monoxide CO and/or hydrocarbons HC can be burned out in the presence of secondary air from the air pump 12. When, on the contrary, the change-over valve 11 operates to introduce the engine exhaust gases into the bypass passage 10 and at the same time the change-over valve 15 operates to circulate the secondary air through the bypass passage 14, then the converting operation, in which the unburned contents are converted into combustion gases, can be stopped.

In the control system of the exhaust gas purification system thus constructed, several detectors are provided which include a detector 16 for detecting the temperature of the engine cooling water, a dectector 17 for detecting the ambient temperature, a detector 18 for detecting the internal temperature of the catalyzer converter, and a detector 19 for detecting the vehicle speed. The detector 16 will produce a pneumatic signal A when the engine has warmed up and the temperature of the engine cooling water exceeds a predetermined level, whereas the detector 17 will produce a pneumatic signal B when the ambient temperature is higher than a predetermined level. The detector 18 will measure the internal temperature of the catalyzer converter with the use of an electrical probe such as a thermocouple. The temperature level thus obtained is then judged in a judgment circuit 20 to operate an electro-pneumatic converter 21. As a result, a pneumatic signal C is produced in the converter 21 when the internal temperature of the catalyzer converter 9 is abnormally elevated to otherwise cause the vehicle to fire. The detector 19 is responsive, on the other hand, to the rotation of the differential gear of the vehicle to electrically detect the speed of rotation. This speed is then judged at a judgment circuit 22 to bring an electro-pneumatic converter 23 into operation. As a result, a pneumatic signal D is produced in the converter 23 when the vehicle is running in a low speed condition including the idling operation. It should be noted here that the above pneumatic signals A to D are normally maintained at an atmospheric pressure but are lowered to the intake manifold vacuum when in the absence of the outputs of the detectors 16 to 19.

Both of these detectors 16 and 17 and the converters 21 and 23 are connected to the inlet side of a selective actuator 40 by way of air passages 24 to 27, respectively. The selective actuator 40 is connected with the secondary air supply passage 13 by way of an air passage 29 provided with a one-way valve 28, so that it can use the maximum level of the discharge pressure of the air pump 12 as a positive pressure source. The selective actuator 40 is, on the other hand, connected to the intake manifold 4 by way of an air passage 32 provided with a one-way valve 30 and a plenum chamber 31. Thus, the actuator 40 can use the maxiumum level of the engine intake vacuum as a negative pressure source. As will be described in more detail, moreover, the selective actuator 40 is operative to logically process the pneumatic signals A to D so as to produce another series of pneumatic signals X, Y and Z. More specifically, the control valve 7 is opened or closed in response to the presence or absence of the pneumatic signal X, which is supplied to an actuating portion 7' of the valve 7 via an air passage 33. The change-over valves 11 and 15 are, on the other hand, brought into the converting operation, when the pneumatic signal Y, which is supplied to either of the actuating portions 11' and 15' of the valves 11 and 15 via an air passage 34, has a positive value, and when the pneumatic signal Z, which is supplied to the other of the actuating portions 11' and 15' via an air passage 35, has a negative value. When, on the contrary, the pneumatic signal Y is negative and the pneumatic signal Z is positive, the change-over valves 11 and 15 are rendered inoperative with respect to the converting action.

Turning now to FIG. 2, the selective actuator 40 will be explained in more detail. The actuator 40 is composed of three substrates 43 to 45 overlying each other through two diaphragms 41 and 42, which are made of rubber for ensuring sealing between the substrates 43 to 45. The actuator 40 is formed with inlets 46 and 47 which are connected with the air passages 25 and 27 for receiving the pneumatic signals B and D. These inlets 46 and 47 are connected with a passage 50 by way of two one-way valves 48 and 49, which are closed in response to the presence of the signals B and D. The actuator 40 is also formed with an inlet 51 which is connected with a passage 53 by way of a one-way valve 52. These passages 50 and 53 have communication with each other by way of a one-way valve 54 which allows an air flow only in the direction from the passage 53.

The passages 50 and 53 also have communication with a common passage 57 by way of two orifices 55 and 56. In the passage 53, on the other hand, an outlet 58 is formed, from which the pneumatic signal X can be extracted. In the passage 57, an air vent 60 is formed which is provided with an air cleaner 59. With this construction, therefore, when the pneumatic signals B and D of atmospheric pressure are supplied to the inlets 46 and 47, the two one-way valves 48 and 49 are closed to prevent establishment of a pressure drop in the orifices 55 and 56, so that the passage 50 restores the atmospheric pressure. Without at least either of the pneumatic signals B and D, on the contrary, at least either of the one-way valves 48 and 49 is opened due to the presence of the prevailing vacuum, so that the pressure in the passage 50 is altered negative. In this way, therefore, a logical product of the pneumatic signals B and D is obtained at the particular passage 50. Since the one-way valve 52 is opened or closed in response to the presence or absence of the pneumatic signal A, the existence of the pneumatic signal X corresponds to that of the pneumatic signal A in the case where the one-way valve 54 is closed with the atmospheric pressure prevailing in the passage 50. In the case, on the contrary, where the passage 50 is maintained at a negative pressure, the one-way valve 54 is opened to render the pressure in the passage 53 negative, and the pneumatic signal X is not produced irrespective of the existence of the pneumatic signal A. Thus, the pneumatic signal X can be obtained from a logical product both of a logical product of the pneumatic signals B and D and of the pneumatic signal A.

In the selective actuator 40, there is provided a three-way change-over valve 68 which includes two chambers 61 and 62 formed at both sides of the diaphragm 42, a valve member 66 connected to the diaphragm 42 for changing communication with three air chambers 63 to 65, and a spring 67 disposed in the chamber 61 for applying a spring force to the diaphragm 42. Another three-way change-over valve 76 is also provided which has a similar construction to that of the change-over valve 68. The change-over valve 76 includes two chambers 69 and 70, three air chambers 71 to 73, a valve member 74 and a spring 75. In these paired change-over valves 68 and 76, the chambers 62 and 70 communicate with each other by way of a passage 77, and the chambers 61 and 69 communicate with each other by way of a passage 78. The chamber 61 is formed with an inlet which is connected with the air passage 26 for receiving the pneumatic signal C, whereas the air chamber 64 is formed with an outlet 80 for the pneumatic signal Y. The chamber 62, on the other hand, communicates with the passage 50. The air chamber 72 is formed with an outlet 81 for the pneumatic signal Z. An inlet 82 for a positive pressure, which is connected with the air passage 29, communicates with the air chambers 65 and 71 by way of a passage 83. Moreover, an inlet 84 for a negative pressure, which connects with the air passage 32, communicates with the air chambers 63 and 73 by way of a passage 85. With this construction, therefore, when the chambers 61 and 69 are maintained at a negative pressure in the absence of the pneumatic signal C and when the chambers 62 and 70 are maintained at the atmospheric pressure by the passage 50, the diaphragms 41 and 42 will be warped against the actions of the springs 67 and 75. This will result in the air chambers 64 and 65 communicating with each other by the action of the valve member 66 to render the pneumatic signal Y positive, and also in the air chambers 72 and 73 communicating with each other by the action of the valve member 74 to render the pneumatic signal Z negative. Either in the case where the passage 50 is maintained at a negative pressure without the pneumatic signal C being introduced, or in the case where the pneumatic pressure C is introduced irrespective of the pressure level in the passage 50, then the diaphragms 41 and 42 are warped in the opposite direction as shown in FIG. 2, so that the air chambers 63 and 64 communicate with each other by the valve member 66 to render the pneumatic signal Y negative and so that the air chambers 71 and 72 communicate with each other by the valve member 74 to render the pneumatic signal Z positive. Thus, the pneumatic signals Y and Z are obtained from a logical product both of the "Not" signal of the pneumatic signal C and of a logical product of the pneumatic signals B and D.

The operation of the control apparatus of the present invention now will be described. When the ambient temperature is low, the detector 17 will not produce the pneumatic signal B. Then, a vacuum prevails in the passage 50 of the selective actuator 40, so that there is no production of the pneumatic signal X. As a result, the control valve 7 is kept closed to stop the recirculation of the exhaust gases. Thus, the air intake system of the engine can be prevented from being attacked by the condensed water which might otherwise be produced due to the recirculation of the exhaust gases in a low temperature condition. The carburetor 3 also can be prevented from being frozen in the presence of the condensed water. At this particular instant, moreover, the threeway change-over valves 68 and 76 act to render the pneumatic signal Y negative and the pneumatic signal Z positive, so that the two change-over valves 11 and 15 will stop the oxidation operation of the catalyzer converter 9. As a result, an undesirable phenomenon can be prevented such as the possible over-heating of the catalyzer, which comes from an excessive increase in the unburned content in the exhaust gases due to the over rich mixture ratio or the so-called "misfire," which might lead to deterioration of the catalyzer itself or to the thermal breakage of the container of the converter 9.

When the vehicle is running at a high speed, the problem of air pollution due to emission of noxious gases from the engine is negligible, as is well-known in the art. Under this condition, therefore, the electro-pneumatic converter 23 stops producing the pneumatic signal D, so that the selective actuator 40 will stop the operation of the exhaust gas recirculation and the oxidation operation of the catalyzer converter 9, as has been described hereinbefore. This can ensure a sufficient output of the engine by eliminating the reduction in combustion efficiency resulting from dilution of the combustible mixture, the power loss consumed in driving the air pump 12 and the increase in the exhaust pressure invited in operating the catalyzer converter 9.

When the vehicle is running at a low speed at a high ambient temperature, the pneumatic signal A will not be produced in the detector 16 until warm-up of the engine has finished. This will establish a vacuum in the passage 53 of the selective actuator 40, so that the control valve 7 is kept closed in the absence of the pneumatic signal X. Thus, the disadvantages due to the exhaust gas recirculation can be prevented, as has been mentioned in the above. When, in this particular instance, the internal temperature of the catalyzer converter 9 is extraordinarily elevated, the detector 18 will produce the pneumatic signal C by way of the judgment circuit 20 and the converter 21. Then, the three-way change-over valves 68 and 76 of the selective actuator 40 will stop the oxidation operation of the catalyzer converter 9, so that danger can be prevented such as the deterioration of the catalyzing agent, thermal breakage of the container of the converter 9 or the vehicle catching on fire.

In the other running conditions of the vehicle, the selective actuator 40 will produce the pneumatic signal X, so that the exhaust gas recirculation can be effected to reduce the $NO_x$ content in the exhaust gases, and so that the pneumatic signal Y will become positive and the pneumatic signal Z will become negative to thereby effect the oxidation operation in the presence of the secondary air, with the resultant reduction in the CO and HC contents.

As has been described hereinbefore, it should be appreciated as a feature of the present invention that the output pneumatic signals of the selective actuator 40, which is operative to logically process the input pneumatic signals, can actuate directly the control valve 7 and the change-over valves 11 and 15 and accordingly that nothing but the pneumatic circuits are required. It should also be appreciated that electro-magnetic mechanisms can be dispensed with in each of the valves 7, 11 and 15 and that the required control system can be so remarkably simplified as to be small sized and to be less costly. It should be further appreciated that the control apparatus according to the present invention can involve a fewer number of parts or elements and that they can be integrated to a greater extent in accordance with their respective functions. It should be further appreciated that the use of the one-way valves 28 and 30 and the plenum chamber 31 can prevent malfunction of the present control apparatus. It should be further appreciated that the detection of the internal temperature of the catalyzer converter or the vehicle speed can enjoy markedly quick response since such detection is carried out with use of electrical sensors.

Although the exhaust gas purification system thus far explained employs a combination of the exhaust gas recirculation system with the catalyzer converter having the secondary air injection system, such another combination can also be employed if the catalyzer converter is replaced by a manifold reactor or an afterburner. In this instance, the change-over valve 11 for effecting interchange between the exhaust pipe 6 and the bypass passage 10 can be dispensed with. The exhaust gas purification system thus modified can be controlled with the use of a similar control apparatus as has been described, by detecting the internal temperature of the manifold reactor or of the afterburner.

The present invention may also be applied to an actuator to be actuated by a positive pressure or vacuum in the exhaust gas purification system. The control apparatus as has been described may be used, for example, in connection with an ignition timing device or a carburetor for the purpose of exhaust gas purification.

What is claimed is:

1. Control apparatus for a fluid cooled engine of a vehicle including an exhaust gas purification system having an exhaust gas recirculation system including a negative pressure source, an exhaust gas oxidation reactor, and a secondary air supply system including a positive pressure source, comprising:

a. first means for detecting the temperature of engine cooling fluid and providing a first pneumatic signal when the fluid temperature exceeds a predetermined level;

b. second means for detecting ambient temperature and providing a second pneumatic signal when the ambient temperature exceeds a predetermined level;

c. third means for detecting the internal temperature of the gas oxidation reactor and providing a third pneumatic signal when the internal temperature exceeds a predetermined level;

d. fourth means for detecting the speed of the vehicle and providing a fourth pneumatic signal when the vehicle speed is lower than a predetermined speed; and e. selective actuating means for logically processing said first, second, third and fourth pneumatic signals to produce fifth, sixth and seventh pneumatic signals which control the exhaust gas recirculation system, the exhaust gas oxidation reactor and the secondary air supply system, said selective actuating means including a first inlet having a first one-way valve for receiving said second pneumatic signal, a second inlet including a second oneway valve for receiving said fourth pneumatic signal, said first and second valves being closed in response to the pressure of said second and fourth pneumatic signals, a first passage connecting said first and second inlets via said first and second valves, a third inlet including a third one-way valve for receiving said first pneumatic signal, a second passage including a fourth one-way valve connected to said third inlet via said third valve and to said first passage via said fourth valve, said fourth valve allowing gas to flow only from said second passage to said first passage, said second passage including a first outlet for said fifth pneumatic signal, a third passage having a pair of orifices and connecting said first and second passages, a gas vent formed in said third passage, a first three-way change-over valve including a first diaphragm and first and second compartments located on either side of said first diaphragm, said second compartment communicating with said first passage, a first valve member, connected to said first diaphragm, for changing communication between first, second and third gas chambers, a first spring, connected within said first compartment, for applying a spring force to said first diaphragm, a second three-way change-over valve including a second diaphragm and third and fourth compartments located on either side of said second diaphragm, a second valve member, connected to said second diaphragm, for changing communication between fourth, fifth and sixth gas chambers, a second spring, connected within said fourth compartment, for applying a spring force to said second diaphragm, a fourth passage connecting said second and third compartments, a fifth passage connecting said first and fourth compartments, a fourth inlet connected to said first compartment and receiving said third pneumatic signal, a second outlet, connected to said second gas chamber, for said sixth pneumatic signal, a third outlet, connected to said fifth gas chamber, for said seventh pneumatic signal, a sixth passage connecting the positive pressure source to said third and fourth gas chambers, and a seventh passage connecting the negative pressure source to said first and sixth gas chamber.

2. A control apparatus according to claim 1 wherein said selective actuating means comprises first, second and third overlying substrates, said first diaphragm sealing said first substrate from said second substrate, and said second diaphragm sealing said second substrate from said third substrate.

3. A control apparatus according to claim 2 wherein said first and second diaphragms are made of rubber.

4. A control apparatus according to claim 1 wherein said first and second diaphragms are warped in opposite directions.

5. A control apparatus according to claim 1 wherein said gas vent includes a gas cleaner.

6. A control apparatus according to claim 1, wherein the exhaust gas oxidation reactor comprises a catalyzer converter.

7. A control apparatus according to claim 1, wherein the exhaust gas oxidation reactor comprises a manifold reactor.

8. A control apparatus according to claim 1, wherein the exhaust gas oxidation reactor comprises an afterburner.

* * * * *